June 29, 1937.  C. O. BROWNE  2,085,571
REPRODUCTION OF SOUND WITH THE AID OF LIGHT
Filed Aug. 15, 1931
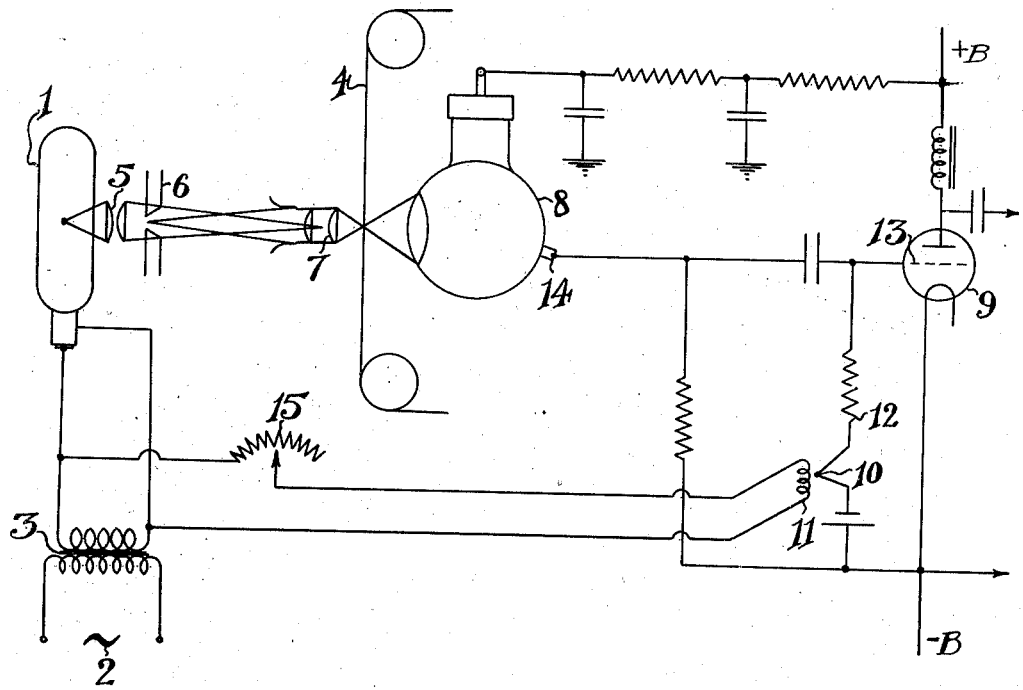
INVENTOR:
Cecil Oswald Browne,
by J R Goldsborough
HIS ATTORNEY.

Patented June 29, 1937

2,085,571

UNITED STATES PATENT OFFICE 2,085,571

REPRODUCTION OF SOUND WITH THE AID OF LIGHT

Cecil Oswald Browne, London, England, assignor to The Gramophone Company Limited, Hayes, Middlesex, England, a company of Great Britain Application August 15, 1931, Serial No. 557,285
In Great Britain August 18, 1930

7 Claims. (Cl. 179—100.3)

The present invention relates to the reproduction of sound with the aid of light.

Methods of reproducing sound are known in which a beam of light, modulated in accordance with the sounds to be reproduced, is passed into a light-sensitive device such, for example, as a photo-electric cell, and electric current impulses generated in the light-sensitive device are amplified and used to energize a loudspeaker. In known apparatus, the exciting source of light must either be of constant intensity, or, if it varies, the frequency of variation may be higher than the highest audio frequency while the average intensity remains constant. Should the exciting source be run off 50 cycle alternating current supply mains, for example, there will be produced by the loudspeaker an undesirable hum of constant pitch corresponding to the frequency at which the light is intermittent.

It is an object of the present invention to provide, in apparatus of the type described above, means whereby an exciting source of light maintained by an alternating current supply may be used for the distortionless reproduction of sound.

According to the present invention, apparatus for the reproduction of sound with the aid of light comprises a light-sensitive cell, a source of light maintained by an alternating current supply, and means including a thermo-electric device for superimposing upon the electrical oscillations in the circuit between the light-sensitive device and the sound reproducing device electrical oscillations substantially equal and opposite to the electrical oscillations produced in said circuit as a result of the intermittency of the light source.

The invention will be described by way of example with reference to the accompanying drawing, which illustrates, diagrammatically, a part of a sound reproducing system arranged in accordance with the present invention.

A source of light 1 is supplied with energy from a mains source 2, which alternates at 50 cycles per second, through a step-down transformer 3. Intermittent light from the source 1 is projected upon a moving film 4 which bears upon its surface, in the form of variations of opacity, a record of the sounds which are to be reproduced. The optical projecting system comprises a collecting lens 5, a slit 6 and a microscope objective 7, all of which are so arranged that an image of the strongly illuminated slit 6 is focussed upon the sound record on the film 4. The latter is drawn through the beam of light by any known or suitable apparatus (which is not illustrated) at a constant speed, and thus all light which passes through the record is modulated in accordance with the sounds to be reproduced. Behind the moving film 4 is placed a photo-electric cell 8 which collects the sound modulated light.

Current oscillations generated in the photo-electric cell 8 are thus of two kinds, namely, the sound oscillations due to variations of opacity of the moving film 4 and the regular oscillations due to the 100 cycle intermittency of the light source 1, which, in turn, is due to the 50 cycle mains supply 2.

The photo-electric cell 8 is connected in the grid-anode circuit of the first valve 9 of an amplifier of any known or suitable type which may comprise, for example, three valves, only the first stage of which is illustrated, and the amplified electrical oscillations are used to energize a loudspeaker, which is not shown.

In accordance with the present invention, the undesirable hum produced in the loudspeaker by the amplified 100 cycle oscillations is neutralized by inserting a thermo-junction 10 in the grid-filament path of the first valve 9 of the amplifier. Currents are generated in the thermo-junction 10 by means of a heating coil 11 which is supplied with current from the alternating source 2 which also supplies the exciting source of light 1, and therefore the frequency of the current impulses generated in the thermojunction 10 are the same as those in the photo-electric cell 8 due to the intermittency of the exciting light. The elements of which the thermo-junction is composed may be connected to one another in such a way that the oscillations developed in the junction will be in such a direction as to cause fluctuations of potential across the high resistance 12 which are 180° out of phase with those fluctuations of potential of the terminal 14 of the photo-electric cell 8 which are due to the intermittency of the light source 1. The fluctuations of potential produced at the grid 13 by the intermittency of the light source 1 and the thermojunction 10 thus tend to oppose each other. In order that they may be made substantially equal and opposite, the heating effect of the coil 11 is adjusted by means of a variable resistance 15. The only fluctuations of voltage remaining to affect the grid 13 of the valve 9 are, therefore, those due to the variations of opacity of the film 4. Sounds reproduced therefrom are thus free from hum.

To those skilled in the art, it will be at once apparent that there are other ways, which lie within the scope of the invention, of introducing variations of current to oppose those developed in the light-sensitive cell as a result of the intermittency of the light source. For example, where the plate potentials of the amplifying valves are supplied from the same alternating source as the exciting lamp by way of the well known electric rectifying and smoothing circuits, some of the smoothing may be omitted in one of the valve circuits and the ripple produced (due to double wave rectification and therefore of the same frequency as that due to the light source intermittency) may be arranged to be equal to and 180° out of phase with the lamp ripple.

In both of the above described apparatus, in order to reduce the amount of hum to be neutralized, it is an advantage if the photo-electric cell used is arranged to be more sensitive to red light than to blue. When the current passed through ordinary filament lamps is varied, the variations in intensity of the blue light emitted are greater than the variations in intensity of the red. In other words, light intensity changes from a source run off alternating current are greater in the blue than the red end of the spectrum, and in order to reduce the effect of the alternations, it is clearly an advantage to use a red-sensitive photo-electric cell. Alternatively, a selenium cell, which is inherently red-sensitive, may be used.

I claim:

1. In a sound reproducing system, a photo-sensitive device, a thermionic amplifier tube having a control grid, a coupling network between the device and the tube, a light source for exciting said photo-sensitive device, a source of alternating potential for energizing said light source, a thermo-electric device and a resistor serially interposed in the input circuit of said amplifier tube and being conductively connected to the control-grid, and means for energizing said thermo-electric device in phase with the energization of said light source, whereby fluctuating potentials impressed upon said input circuit from said photo-sensitive device by reason of fluctuations in said light source resulting from energization thereof by said alternating potential source may be counteracted.

2. The invention set forth in claim 1 characterized in that the coupling network specified is of the resistance-condenser type.

3. The invention set forth in claim 1 characterized in that the input circuit specified includes serially a grid leak, a bias potential supply, and the thermoelectric device.

4. The invention set forth in claim 1 characterized in that the coupling network includes a resistor in the output circuit of the photo-sensitive device, a stopping condenser and a grid leak, and additionally characterized in that the thermo-electric device is connected in series with the grid leak.

5. In a sound reproducing system, a photo-sensitive device, a thermionic amplifier tube having a control-grid, a coupling network between said device and said tube, a light source for exciting said photo-sensitive device, a source of alternating potential for energizing said light source, a thermo-electric device and a resistor serially interposed in the input circuit of said amplifier tube and being conductively connected to said control-grid, and means for energizing said thermo-electric device in phase with the energization of said light source, the elements of said thermo-electric device being so poled with respect to the input electrodes of said tube that, when said thermo-electric device is energized, the potentials developed thereacross will neutralize the fluctuating potentials impressed upon said input circuit from said photo-sensitive device by reason of fluctuations in said light source resulting from energization thereof by said alternating potential source.

6. In a sound reproducing system, a photo-sensitive device, a thermionic amplifier tube having a control-grid, a coupling network between said device and said tube, a light source for exciting said photo-sensitive device, a source of alternating potential for energizing said light source, a thermo-electric device and a resistor serially interposed in the input circuit of said amplifier tube and being conductively connected to said control-grid, and means for energizing said thermo-electric device in phase with the energization of said light source, the elements of said thermo-electric device being so poled with respect to the input electrodes of said tube that, when said thermo-electric device is energized, the potentials developed thereacross will be 180° out of phase with the fluctuating potentials impressed upon said input circuit from said photo-sensitive device by reason of the fluctuations in said light source resulting from energization thereof by said alternating potential source whereby to neutralize the last named fluctuating potentials impressed upon said input circuit.

7. In a system for reproducing sound by means of light, the combination of a light source, a source of fluctuating potential for energizing said light source, a light sensitive device on which falls light from said source, an electronic amplifier coupled to said light sensitive device and having an input circuit, a thermo-electric device included in said input circuit for compensating for changes in the light from said source occasioned by the fluctuations in the potential supplied thereto, and heating means for said thermo-electric device connected to said source of fluctuating potential.

CECIL OSWALD BROWNE.